Figure 1:
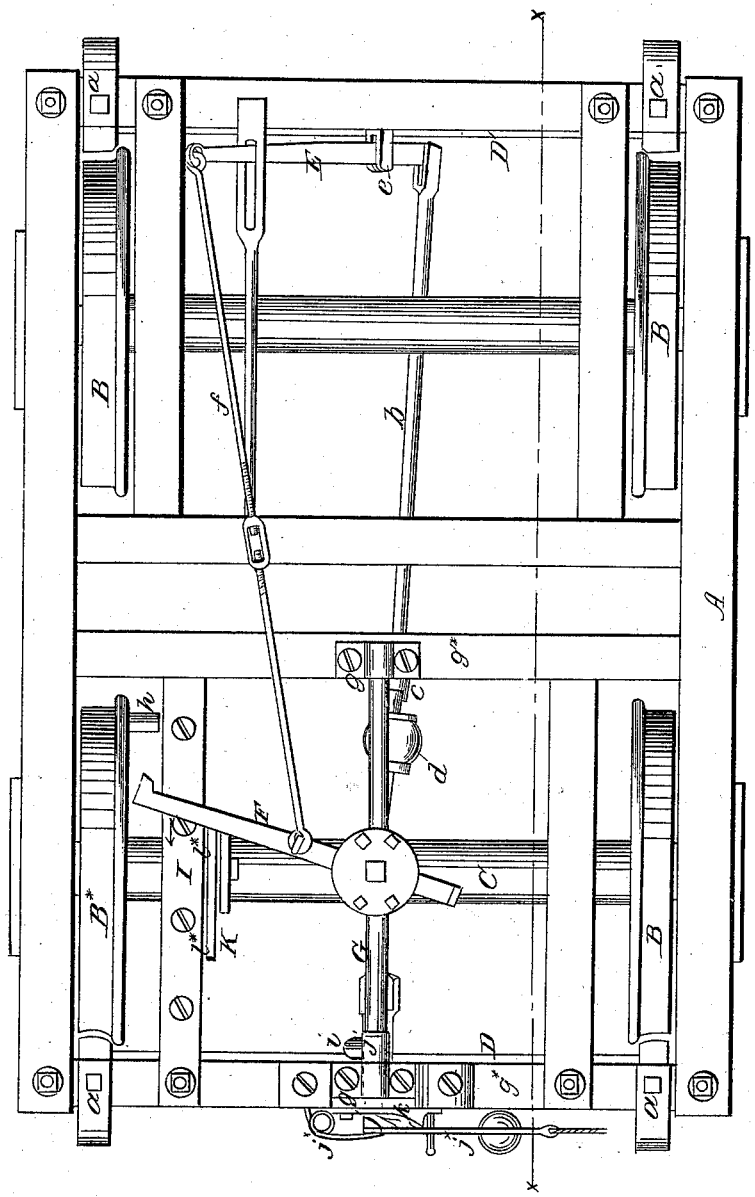

B. MORAHAN.
Car Brake.

No. 43,370.

2 Sheets—Sheet 1.

Patented June 28, 1864.

Witnesses.
J. W. Coombs
W. Hauff

Inventor
Bernard Morahan

B. MORAHAN.
Car Brake.
No. 43,370.
2 Sheets—Sheet 2.
Patented June 28, 1864.
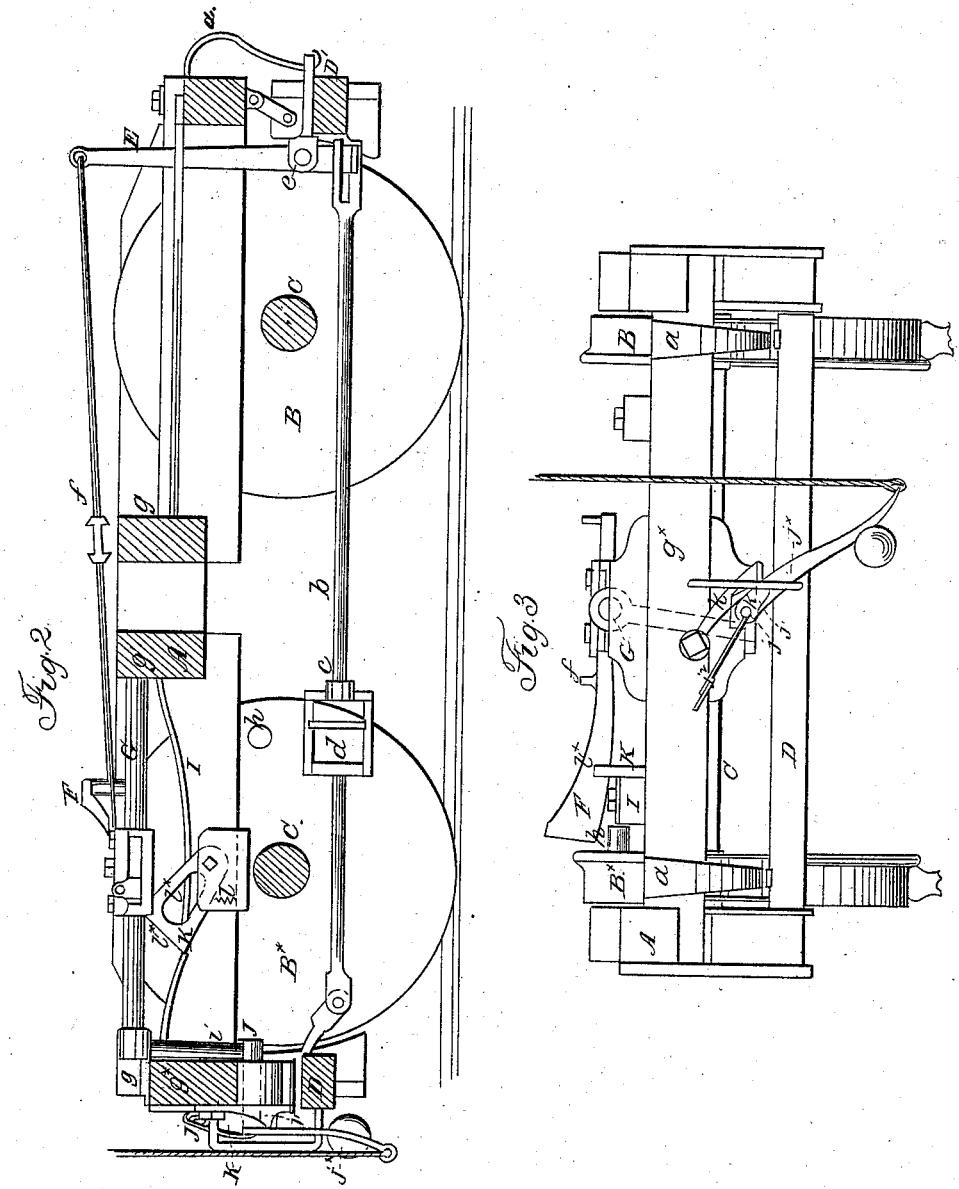
Witnesses.
J. W. Coombs
W. Kauff
Inventor.
Bernard Morahan

UNITED STATES PATENT OFFICE.

BERNARD MORAHAN, OF BROOKLYN, ASSIGNOR TO JOSEPH L. JERNEGAN, OF NEW YORK, N. Y.

IMPROVEMENT IN CAR-BRAKES.

Specification forming part of Letters Patent No. 43,370, dated June 28, 1864; antedated June 23, 1864.

*To all whom it may concern:*

Be it known that I, BERNARD MORAHAN, of Brooklyn, in the county of Kings and State of New York, have invented a new and Improved Car-Brake; and I do hereby declare that the following is a full, clear, and exact description of the same, reference being had to the accompanying drawings, forming part of this specification, in which—

Figure 1 represents a plan or top view of my invention. Fig. 2 is a longitudinal vertical section of the same, the line $x\,x$, Fig. 1, indicating the plane of section. Fig. 3 is a front elevation of the same.

Similar letters of reference in the three views indicate corresponding parts.

This invention consists in the arrangement of a hinged or adjustable lever or dog in such relation to a stud projecting from the side of the car-wheel and to the brakes that when said dog is lowered or brought in such a position as to come in contact with the stud the brakes are applied by the direct action of said stud, and when the dog is raised so as to clear the stud the brakes are taken off.

The invention consists also in the employment or use of a sliding or movable stop, and of a hinged spring latch, in combination with the adjustable dog, in such a manner that by withdrawing the stop the dog is brought in position to come in contact with the stud and to cause the brakes to be applied, and after the brakes have been applied the latch and stop combined retain the dog and prevent it releasing the brakes, until by a new change in the position of the stop and by the inclined face of the latch the dog is thrown back to its original position, thereby taking off the brakes and clearing the stud on the wheel.

The invention consists, further, in the application of a weighted lever and hinged cam in combination with the stop and dog in such a manner that by raising said lever and dropping it again the position of the stop and that of the dog are changed, and by this simple motion the brakes are applied and taken off instantaneously.

To enable those skilled in the art to make and use my invention, I will proceed to describe it.

A represents the truck-frame of a railroad-car which is constructed in the usual manner, and supported by the axles C and wheels B B*.

D D' are the brake-heads, which are suspended from the end timbers of the truck-frame, and subjected to the action of springs $a$ in the ordinary manner. The two brake-heads are connected by a rod, $b$, the length of which is adjustable by a screw-coupling, $c$, and which is subjected to the action of a spring, $d$, of india rubber, which serves to regulate the power with which the brake-shoes are forced up against the faces of the wheels B B*. By increasing the tension of this spring the power with which the shoes bear on the wheels is increased, and by decreasing the tension of the spring said power is diminished.

The brakes are applied by the action of a lever, E, which has its fulcrum on a pivot, $e$, in a bracket secured to the brake-head D'. The lower and short arm of this lever connects with one end of the rod $b$, (the other end of which is secured to the brake-head D,) and its upper or long arm connects by a rod, $f$, with the adjustable dog F, that forms the principal element of my invention. This dog is hinged to a rock-shaft, G, which has its bearings in suitable boxes, $g$, in the center of the cross-timbers $g^*\ g'^*$ of the truck-frame, and it (the dog) extends from said rock-shaft in a horizontal direction close to the inner surface of the wheel B*. This wheel is armed with a stud, $h$, which is firmly inserted in its side, and when the brakes are off the dog F must be held in such a position as to clear the stud $h$, for the moment the stud $h$ strikes said dog the brakes are applied.

In order to govern the position of the dog, an arm, $i$, extends from the rock-shaft G in a downward direction, and this arm rests against one side or the other of a stop, $j$. If this arm rests against that side of said stop facing the wheel B*, (see Figs. 2 and 3,) the dog is held in such a position that it clears the stud $h$; but if it (the arm $i$) rests on the opposite side of the stop, the dog is in position to meet the stud $h$, and when the wheel revolves and the stud strikes the dog the brakes are applied.

The stud $j$ consists of a round pin, which slides in and out in a horizontal socket in the cross-timber $g^*$ of the truck-frame, and its outer end is flattened, so that it forms a shoulder, $j'$, (see Fig. 2,) and it connects with a weighted lever, $g^*$. A weak spring, $j^2$, holds said stop close up to the shoulder until the weighted lever is raised and dropped again. In raising said lever the shoulder $j'$ carries up with it a cam, $k$, which is hinged to the outside of the cross-timber $g^*$, and after having been raised a certain distance said cam drops back to its original position, and it is now situated below the shoulder $j'$ of the stop. If the lever is then again lowered, the shoulder $j'$ slides over the inclined edge or face of the cam and the stop $j$ is withdrawn for a short period of time until the shoulder $j'$ passes the cam $k$, and the stop is forced back to its original position by the action of the spring $j^2$. During that short period for which the stop is withdrawn the arm $i$ of the rock-shaft $G'$ is not supported, and the dog F has time to change its position either for the purpose of applying the brakes or to take them off. If the arm $i$ of the rock-shaft is on that side of the stop $j$ which faces the wheel $B^*$, the dog F is held in such a position that it clears the stud $h$ and the brakes are off. If now the weighted lever is raised and lowered, so as to withdraw the stop $j$ for a short interval, the dog F drops down upon the longitudinal timber I in such a position that the stud $h$ will come in contact with it and carry it in the direction of the arrow marked near it in Fig. 1. As the dog moves in this direction it passes over a latch, K, which is hinged to the inside of the longitudinal timber I, and which is subjected to the action of weak spring $l$. This latch is made in the form of a right-angled triangle, the right angle being turned up, and as the dog moves in the direction of the arrow it slides over the edge $l^*$ of the latch, and said latch is depressed to a level with the upper surface of the timber I until the stud $h$ has carried the dog far enough to clear the right-angled corner of the latch. At this stage the latch begins to rise again and by the time the dog has been carried far enough in the direction of the arrow to clear the stud $h$ the latch has returned to its original position and the dog is held by the side $l^*$ of said latch and by the stop $j$, which prevents the rock-shaft from turning back, and consequently the dog from rising and clearing the latch. While the dog is in this position the brakes are applied and the brake-shoes bear on the faces of the wheel with such power as may be determined by the regulating-spring $d$.

In order to take off the brakes the weighted lever $j^*$ is again raised and dropped, and by this action the stop $j$ is withdrawn sufficiently long to allow the arm $i$ to change its position, and as soon as said arm is freed the dog F, impelled by the springs $a$, (which act on the brake-heads and have a tendency to take off the brakes,) flies up the inclined side $l'^*$ of the latch and turns the rock-shaft G, so that the stop $j$ will catch behind the arm $i$ and the dog assumes its original position, in which it clears the stud $h$ and allows the wheel $B^*$ to rotate without applying the brakes.

The weighted lever $j^*$ is operated by a cord or chain from the platform of the car, and it is obvious that by suitable connections all the brakes of a car or of an entire train can be applied simultaneously by the action of the stud $h$ on the dog F.

What I claim as new, and desire to secure by Letters Patent, is—

1. The adjustable dog F, or its equivalent, arranged in combination with a stud or projection, $h$, on the side of the wheel $B^*$, and with the brakes D D′, substantially as herein specified, so that by the direct action of the stud or projection on the dog the brakes are applied.

2. The movable stop $j$ and hinged spring-latch K, or their equivalents, applied in combination with the dog F and stud or projection $h$, in the manner and for the purpose substantially as herein set forth.

3. The weighted lever $j^*$ and the hinged cam $k$, or their equivalents, in combination with rock-shaft G, arm $i$, dog F, and stud $h$, all arranged and operating substantially as and for the purpose herein shown and described.

BERNARD MORAHAN.

Witnesses:
W. HAUFF,
THOS. L. J. DOUGLAS.